United States Patent [19]
Davila, Sr.

[11] Patent Number: 6,100,499
[45] Date of Patent: Aug. 8, 2000

[54] HEATED AND LIGHTED WINDSHIELD WIPER ASSEMBLY

[76] Inventor: Richard A. Davila, Sr., 1025 W. Rose St., South Bend, Ind. 46616

[21] Appl. No.: 09/173,156

[22] Filed: Oct. 14, 1998

Related U.S. Application Data

[63] Continuation-in-part of application No. 08/833,844, Apr. 10, 1997.

[51] Int. Cl.$^7$ ............................................................ B60L 1/02
[52] U.S. Cl. ......................... 219/202; 15/250.06; 15/250.04
[58] Field of Search .................................. 219/202, 203, 219/220; 362/80.1, 61; 392/411; 15/250.001, 250.05

[56] References Cited

U.S. PATENT DOCUMENTS

| | | | |
|---|---|---|---|
| 2,387,953 | 10/1945 | Terry ......................................... | 340/581 |
| 2,650,355 | 8/1953 | Pieczonka ................................. | 362/540 |
| 3,195,161 | 7/1965 | Haluck et al. ........................ | 15/250.06 |
| 3,587,129 | 6/1971 | Linker .................................... | 15/250.06 |
| 4,360,941 | 11/1982 | Mabie .................................... | 15/250.06 |
| 4,670,933 | 6/1987 | Toplenszky ............................ | 15/250.07 |
| 5,305,190 | 4/1994 | Clement ................................... | 326/83.3 |
| 5,572,765 | 11/1996 | Guell ..................................... | 15/250.06 |
| 5,632,058 | 5/1997 | Stanak ................................... | 15/250.06 |
| 5,787,543 | 8/1998 | Selders ................................... | 15/250.06 |
| 5,799,390 | 9/1998 | Dileo et al. ............................... | 29/611 |
| 5,826,293 | 10/1998 | Holland ................................. | 15/250.06 |
| 5,832,558 | 11/1998 | Ehret et al. .......................... | 15/250.06 |

FOREIGN PATENT DOCUMENTS 0332081  9/1989  European Pat. Off. .

*Primary Examiner*—Teresa Walberg
*Assistant Examiner*—Vinod D Patel
*Attorney, Agent, or Firm*—John D. Gugliotta

[57] ABSTRACT

An apparatus to be used by motor vehicle drivers under conditions such as freezing rain, sleet or snow to allow improved forward vision. Comprised of a conventional windshield wiper assembly having an electrically conductive arm and a first elongated conductor, such as an insulated wire having a first end opposite a second end is provided, wherein the first end terminated by a first terminal connection at the base end of the wiper arm, and the second end is terminated at the electrical ground plane of the motor vehicle. A second elongated conductor is terminated at one end by a second terminal connection at the distal end of the wiper arm, and at the opposing end is electrically connected to an imbedded heating element in the wiper blade. A third elongated conductor is electrically connected at one end to the electrically opposing terminal on the imbedded heating element in the wiper blade and is routed down the wiper arm and is held close the wiper arm by a harnessing means such as a plurality of spaced clip connectors. The opposing end of the third elongated conductor communicates directly with a voltage control regulator for controlling or stopping electrical current. The system is electrically connected to the motor vehicle's existing fuse box to serve as the electrical power source.

11 Claims, 3 Drawing Sheets

HEATED AND LIGHTED WINDSHIELD WIPER ASSEMBLY

RELATED APPLICATIONS

The present invention is a Continuation-In-Part (CIP) of Ser. No. 08/833,844, filed on Apr. 10, 1997, now abandoned.

BACKGROUND OF THE INVENTION

1. Field of the Invention

The present invention relates generally to windshield wipers for vehicles and, more particularly, to a windshield wiper having integrated heat and light sources within actuator arm assembly for aiding in use under conditions of dark, ice and snow buildup.

2. Description of the Related Art

Many vehicles include windshield wipers to aid with visibility during inclement weather. Whether on motor vehicles, planes, or boats, these wipers and their windshields are subject to ice and snow buildup in cold weather conditions. Such buildups can restrict vision and increase safety risks.

In the related art, many methods of vehicle windshield deicing are known. For example, in U.S. Pat. No. 5,467,522, issued in the name of Gold, a windshield wiper deicing windshield and method of constructing same is disclosed in which glass panels having a resistive conductive coating is utilized to complete an electrical circuit which causes deicing through resistive heating.

Another problem associated with icing of windshields occurs from the freezing of the wiper to the vehicle rest zone. One attempt to eliminate such adhering is disclosed in U.S. Pat. No. 5,173,586, issued in the name of Gold, in which an electric heating attachment for deicing the wiper rest zone of a vehicle windshield is described, Numerous attempts have been made to correct for the foregoing problems by heating the entire wiper assembly. Examples appear in U.S. Pat. No. 4,497,083, issued in the name of Nielsen, Jr. et al., in U.S. Pat. No. 3,619,556, issued in the name of Deibel et al., and in U.S. Pat. No. 3,408,678, issued in the name of Linker.

Although such devices as disclosed have proven effective, none have proven to be commercially successful due to many factors, such as cost and awkwardness of incorporating separate heating elements, or the inability to adapt to existing wiper designs. Further, although the aesthetics of such designs are necessarily out of the ordinary, none so far have been able to generate either an aesthetic pleasantness, or sufficient uniqueness to encourage consumers to tolerate such visually unaccustomed devices. Consequently, a need has been felt for providing an improved but less complex mechanism and method which overcomes such deficiencies.

SUMMARY OF THE INVENTION

It is therefore an object of the present invention to provide an improved windshield wiper assembly.

It is another object of the present invention to provide an improved windshield wiper assembly heating apparatus.

It is yet another object of the present invention to provide an improved windshield wiper assembly lighting apparatus.

It is a feature of the present invention to provide an improved windshield wiper assembly that incorporates a decorative lighting apparatus that generates sufficient heat to be useful in melting frost, ice, or snow. Additionally, the present apparatus can be incorporated onto or adapted with existing wiper designs.

Briefly described according to the preferred embodiment of the present invention, a windshield wiper assembly lighting apparatus is disclosed for connecting to a conventional windshield wiper assembly. The heat output of the lighting apparatus, in optional combination with an electrically conductive wiper arm, function additional as a windshield wiper assembly heating apparatus. A first elongated conductor, such as an insulated wire having a first end opposite a second end is provided, wherein the first end terminated by a first terminal proximal connection at the base end of the wiper arm, and the second end is terminated at the electrical ground plane of the motor vehicle. A second elongated conductor is terminated at one end by a second terminal connection at the proximal end of the wiper arm, and at the opposing end is electrically connected to an second lamp assembly imbedded in the wiper blade housing. A third elongated conductor is electrically connected at one end to the electrically opposing terminal on the integral lamp assembly in the wiper blade and is routed down the wiper arm and is held close the wiper arm by a harnessing means such as a plurality of spaced clip connectors. The opposing end of the third elongated conductor communicates directly with a voltage control regulator for controlling or stopping electrical current. The system is electrically connected to the motor vehicle's existing fuse box to serve as the electrical power source.

Advantages of the present invention include the application of a light source at the wiper assembly, thereby providing a novelty appearance similar in scope to cap lights, running lights, and the like.

Another advantage of the present invention is that by utilizing a heat available from the light source, radiant heat transfer can be accomplished in order to diminish frost, snow, or ice on the wiper assembly during inclement weather.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
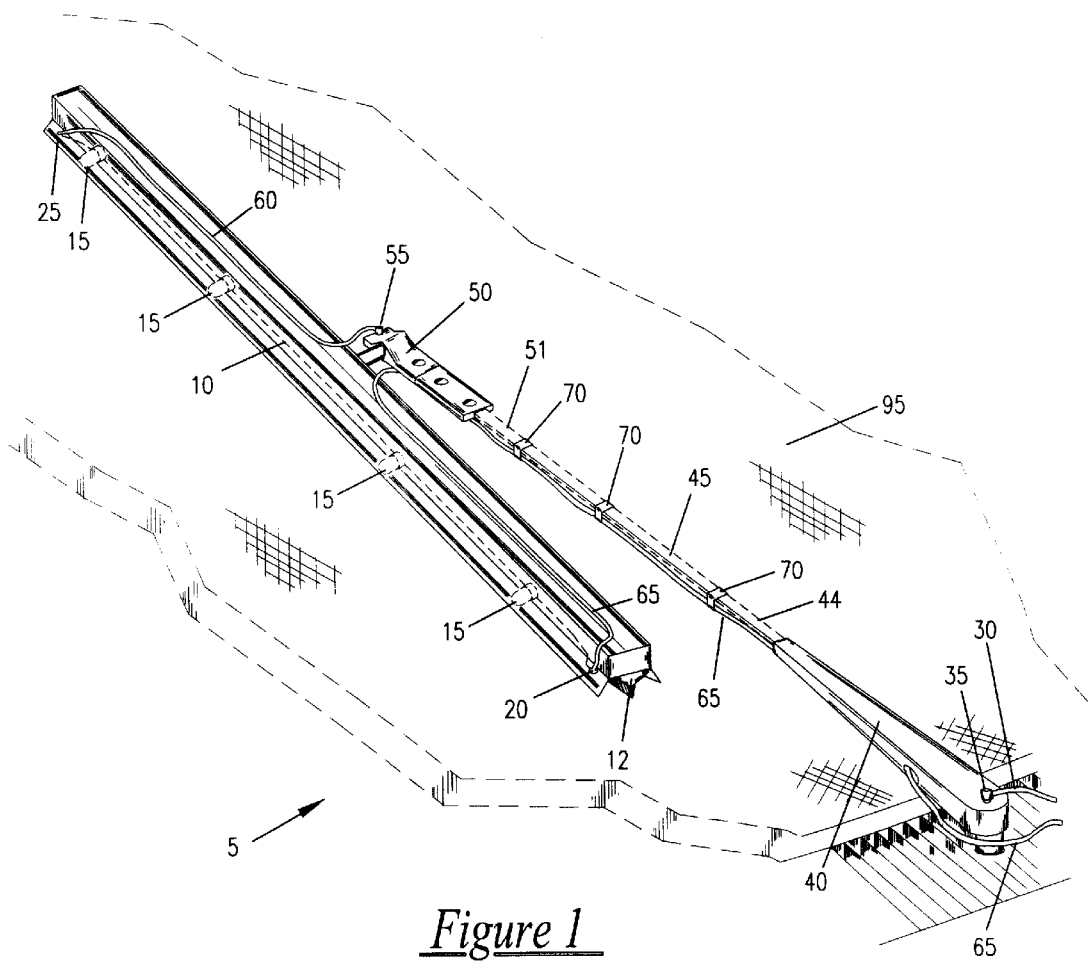
FIG. 1 is a perspective view of a windshield wiper assembly lighting and heating apparatus according to the preferred embodiment of the present invention.

Referring now to FIG. 1, a perspective view of a windshield wiper assembly lighting apparatus 5, according to the preferred embodiment of the present invention is depicted. The windshield wiper assembly lighting apparatus 5 consists of a wiper housing 10 that supports a conventional wiper blade 12 and at least one integral lamp assembly 15. Although other embodiments are envisioned based upon the teachings of the present disclosure, for purposes of enablement and disclosure four lamp assemblies are shown. It is envisioned that each integral lamp assembly 15 is comprised of a halogen type bulb, due to high thermal output of such devices. Other readily adaptable technologies, easily envisioned by those familiar in the art include a semi-conductive compound in the wiper blade itself, or a separate wire wound heating element that transfers heat by convection to surrounding windshield surfaces. A positive connection means 20 and a negative connection means 25 are provided to allow the transfer of electrical power to the integral lamp assemblies 15. A first elongated conductor 30, such as an insulated wire, is connected to a first terminal connection 35 on the vehicle wiper arm actuator 40. The wiper arm actuator 40 is physically and mechanically attached to the proximal end 44 of a linearly elongated wiper arm 45. A wiper housing support bracket 50 is connected to the distal end 51 of the wiper arm 45 and supports the wiper housing 10 therefrom. The assembly consisting of the wiper arm actuator 40, the wiper arm 45 and the wiper housing support bracket 50 is the same assembly as furnished as standard equipment on a motor vehicle and is visualized as electrically conductive, and modified accordingly to work with the windshield wiper assembly heating apparatus 5 as described herein. A second terminal connection 55 is provided on the wiper housing support bracket 50 as shown. Both the first terminal connection 35 and the second terminal connection 55 are physically and electrically connected to the wiper arm actuator 40, allowing for a complete electrical path from the first terminal connection 35 to the second terminal connection 55. A second elongated conductor 60 provides the electrical path from the negative connection means 25 to the second terminal connection 55 as shown. A third elongated conductor 65 provides the completed circuit from the positive connection means 20 of the integral lamp assembly 15 as shown. The remainder of the electrical circuit as would be connected to the first elongated conductor 30 and the third elongated conductor 65 will be described in greater detail below. The third elongated conductor 65 is routed from the distal end 51, down the wiper arm 45 to the proximal end 44 and to the wiper arm actuator 40 as shown, where it is mechanically fastened, but electrically isolated, by a conductor harnessing means 70 such as a plurality of spaced clip connectors.

Figure 2:
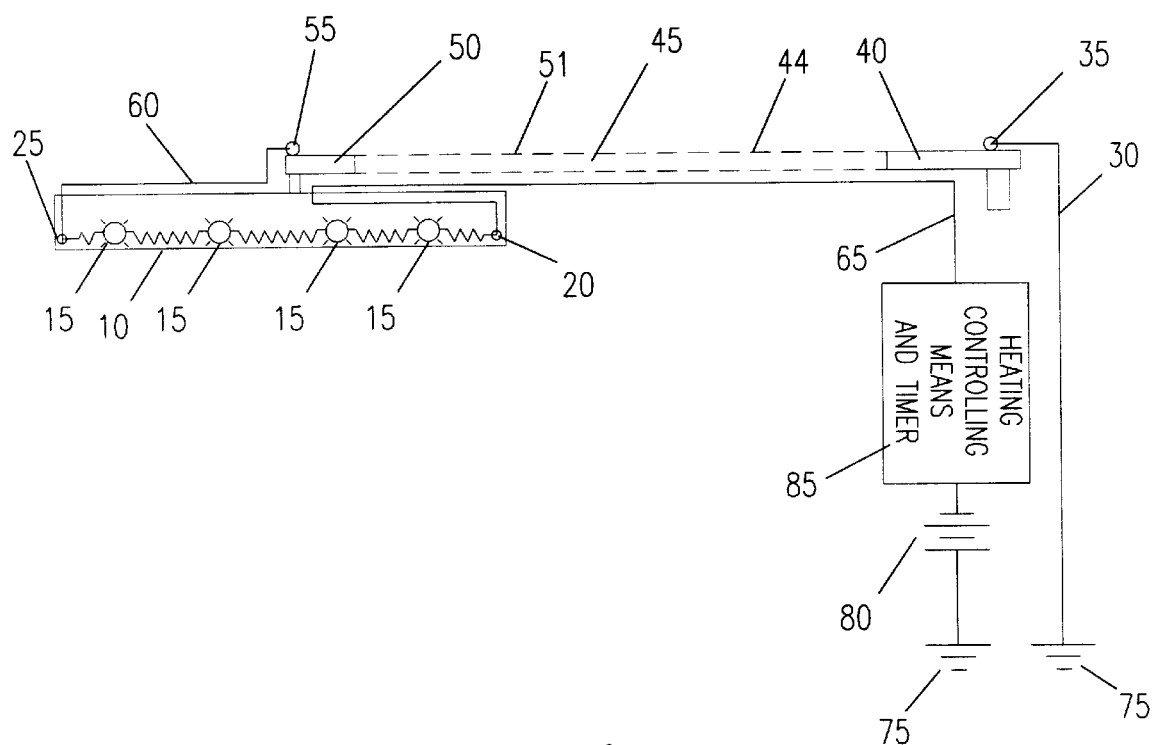
FIG. 2 is a functional electrical schematic for the circuit created by the present invention.

Referring next to FIG. 2, a functional electrical schematic for the circuit created by the windshield wiper assembly heating apparatus 5 is disclosed. A ground plane 75 on the motor vehicle is established for a common point of voltage reference. It is intended that the ground plane 75 be the metal chassis of the motor vehicle as is commonly understood. From the ground plane 75, a secure electrical connection to establish the wiper arm actuator 40 at the same voltage potential as the ground plane 75 is made via the first elongated conductor 30 and the first terminal connection 35. While the wiper arm actuator 40 may be at the same potential as the ground plane 75 without the added connection of the first elongated conductor 30, the connection is made regardless to ensure current carrying capabilities thorough the moving mechanical portions wiper arm actuator 40 defined as the pivot point of a conventional windshield wiper blade. The electrical connection as defined above through the wiper arm actuator 40, the wiper arm 45 and the wiper housing support bracket 50 allow the second terminal connection 55 to be at the same electrical potential as the ground plane 75. Finally, the potential of the ground plane 75 is carried to the negative connection means 25 via the second elongated conductor 60. An electrical potential source 80, comprised of the motor vehicle battery, alternator, regulator and over current protection system, imposed upon the ground plane 75 provides the electrical power necessary for the windshield wiper assembly heating apparatus 5. A voltage controller means 85 is provided to allow user control of the activation of the windshield wiper assembly heating apparatus 5. The voltage controller means 85 is depicted as a common switch, though it can be easily visualized by those familiar in the art, that other means, such as a rheostat, solid-state control circuit, or a stepped voltage divider circuit could also be substituted to allow even further user control over the windshield wiper assembly heating apparatus 5 by allowing incremental control of the voltage potential thus applied. It is also anticipated that the voltage controller means 85 will be provided with a timing feature to automatically deactivate the windshield wiper assembly heating apparatus 5 after a preset period of time such that the windshield wiper assembly heating apparatus 5 will not remain activated indefinitely. Finally, the potential is carried from the voltage controller means 85 to the positive connection means 20 of the integral lamp assemblies 15 by the third elongated conductor 65. Now the electrical potential developed across the integral lamp asemblies 15 is converted to heat via a resistive heating scenario, creating both an aesthetically pleasing illumination of the wiper housing 10 while causing any accumulation of frozen precipitation to melt.

Figure 3:
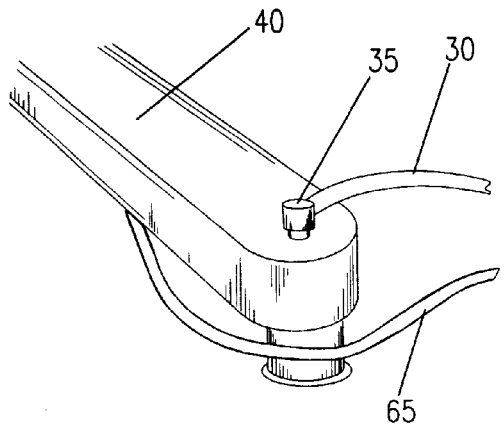
FIG. 3 is an exploded perspective view of the wiper arm assembly shown in FIG. 1, wherein the first terminal connection is more fully depicted.
Figure 4:
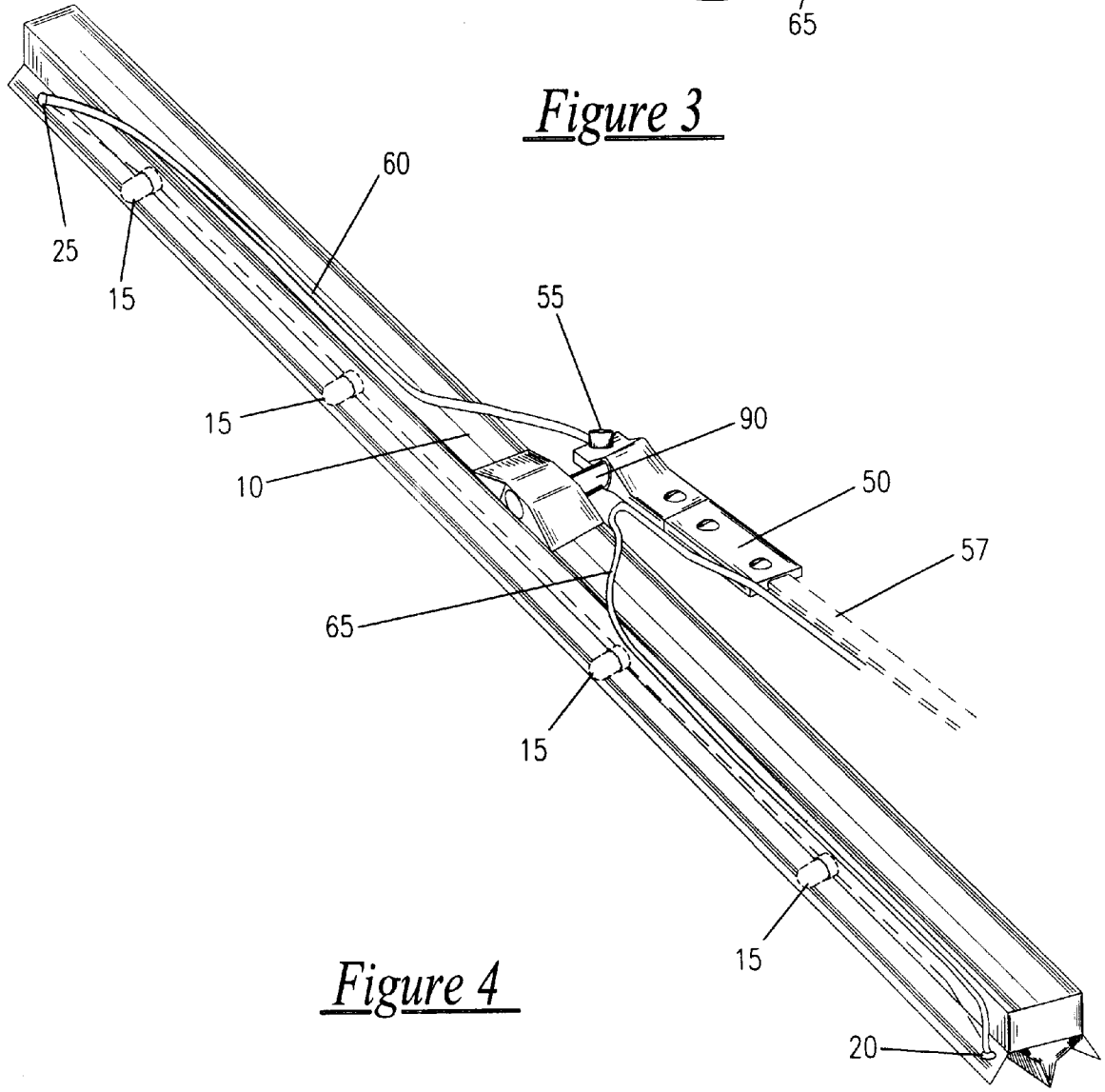
FIG. 4 is a perspective view of a vehicle driver compartment depicting the present invention in use.

Referring now to FIG. 3a, an exploded perspective view of the wiper arm actuator 40 as shown in FIG. 1, is disclosed wherein the first terminal connection 35 is more fully depicted. The first terminal connection 35 is attached to the wiper arm actuator 40 via a mechanical method which allows electrical continuity. Examples of this type of method include crimp-on lugs, mechanical slide-on or bolt-on lugs, welding, brazing, or soldering. Both the first elongated conductor 30 and the third elongated conductor 65 are composed of stranded wire to allow for the repeated bending and flexing necessary to accommodate the movement necessary for the conventional movement of the base end of wiper arm 40 without internal breakage.

Referring finally to FIG. 3b, an exploded perspective view of the wiper housing support bracket 50 as shown in FIG. 1 is disclosed, where the second terminal connection 55 is more fully depicted. The second terminal connection 55 is attached to the wiper housing support bracket 50 via a mechanical method which allows electrical continuity as well. Examples of this type of method include crimp-on lugs, mechanical slide-on or bolt-on lugs, welding, brazing, or soldering. The wiper blade 10 is attached to the wiper housing support bracket 50 by a connection rod 90 as shown. The connection rod 90 is of the conventional type and can take many different forms as offered by various motor vehicle manufacturers.

2. Operation of the Preferred Embodiment

In operation, the present invention can be installed and utilized by the common user in a simple and effortless manner. To use the present invention with its preferred embodiment can best be described in conjunction with the perspective view of FIG. 1, the functional electrical schematic of FIG. 2, the exploded perspective view of the wiper arm actuator 40 as shown in FIG. 3a and the exploded perspective view of the wiper housing support bracket 50 as shown in FIG. 3b.

The user would begin installation of the windshield wiper assembly heating apparatus 5 by removing the existing conventional wiper assembly and replacing it with the wiper housing 10 by connecting the connection rod 90 to the wiper housing support bracket 50. Next, the second terminal connection 55 would be attached to the wiper housing support bracket 50 and the second elongated conductor 60 would be connected to the second terminal connection 55. Then the first terminal connection 35 would be attached to the wiper arm actuator 40 and the first elongated conductor 30 would be connected to the first terminal connection 35. The third elongated conductor 65 would be routed down the wiper arm 45 and secured thereto via the conductor harnessing means 70. Both the first elongated conductor 30 and the third elongated conductor 65 would then be routed through the engine compartment and the vehicle firewall where they would connect to the voltage controller means 85 and the ground plane 75. Initial installation of the windshield wiper assembly heating apparatus 5 would also include installation of the voltage controller means 85 and its associated connection to the electrical potential source 80. The process would then be repeated for the other wiper blade on those vehicles with two windshield wipers. At this point the windshield wiper assembly heating apparatus 5 is now ready for use.

When weather conditions such as freezing rain, sleet, snow, etc. are present under driving conditions and vision through the windshield becomes impaired, the user simply activates the voltage controller means 85 and the integral lamp assemblies 15 in the wiper housing 10 are activated. The heat generated by the integral lamp assemblies 15 serves to melt above-mentioned precipitation allowing the wiper blades 12 to effectively remove precipitation from the windshield 95, improving forward vision and producing safer driving conditions. When the precipitation ceases, the user simply deactivates the voltage controller means 85.

The foregoing description is included to illustrate the operation of the preferred embodiment and is not meant to limit the scope of the invention. The scope of the invention is to be limited only by the following claims.

What is claimed is:

1. A windshield wiper assembly comprising:
   a wiper arm having a base end and a distal end, said base end having a first terminal connection and said distal end having a second terminal connection;
   a wiper blade;
   at least one lamp assembly, said at least one lamp assembly affixed to said wiper arm and comprised of a high thermal output halogen type bulb for lighting and heating;
   positive connection means to allow the transfer of electrical power to said lamp assembly;
   negative connection means to allow the transfer of electrical power to the lamp assembly;
   a first elongated conductor connected to said first terminal connection at said base end of wiper arm;
   a second elongated conductor to said second terminal connection for providing an electrical path from the negative connection means; and
   a third elongated conductor for providing a completed circuit from the positive connection means of the lamp assembly;
   and wherein said base end of wiper arm, said wiper arm and said distal end of said wiper arm are electrically conductive and in electrical communication together allowing for a complete electrical path from the first terminal connection to the second terminal connection.

2. The windshield wiper assembly of claim 1, wherein said the third elongated conductor is routed down the distal end of wiper arm, the wiper arm and the base end of wiper and is mechanically fastened, but electrically isolated, by conductor harnessing means.

3. The windshield wiper assembly of claim 2, wherein said conductor harnessing means comprises a plurality of spaced clip connectors.

4. The windshield wiper assembly of claim 1, further comprising voltage controller means for allowing a user to control the activation of the windshield wiper assembly lamp assembly.

5. The windshield wiper assembly of claim 4, wherein said voltage controller means includes a member selected from the group comprised of a switch, a rheostat, a solid-state control circuit, and a stepped voltage divider circuit.

6. The windshield wiper assembly of claim 5, wherein said voltage controller means includes a timing feature to automatically deactivate the windshield wiper assembly heating apparatus after a preset period of time such that the windshield wiper assembly lamp assembly will not remain activated indefinitely.

7. The windshield wiper assembly of claim 1, wherein said first terminal connection is attached to the base end of wiper arm via a mechanical method which allows electrical continuity as well.

8. The windshield wiper assembly heating apparatus of claims 7, wherein said mechanical method includes a member selected from the group comprising crimp-on lugs, mechanical slide-on lugs, bolt-on lugs, welding, brazing, and soldering.

9. The windshield wiper assembly heating apparatus of claim 7, wherein said mechanical method includes a member selected from the group comprising crimp-on lugs, mechanical slide-on lugs, bolt-on lugs, welding, brazing, and soldering.

10. The windshield wiper assembly heating apparatus of claim 1, wherein said second terminal connection is attached to the base end of wiper arm via a mechanical method which allows electrical continuity as well.

11. The windshield wiper assembly heating apparatus of claim 1, wherein wiper blade is attached to the distal end of wiper arm by a connection rod.

* * * * *